United States Patent
Burlage et al.

(10) Patent No.: US 6,857,626 B2
(45) Date of Patent: Feb. 22, 2005

(54) SPRING ELEMENT

(75) Inventors: Thomas Burlage, Wallenhorst (DE); August-Wilhelm Gelmke, Diepholz (DE); Frederic Nyssen, Lemförde (DE); Jan Wucherpfennig, Brockum (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/312,276

(22) PCT Filed: Jul. 10, 2001

(86) PCT No.: PCT/EP01/07943

§ 371 (c)(1),
(2), (4) Date: Dec. 20, 2002

(87) PCT Pub. No.: WO02/06696

PCT Pub. Date: Jan. 24, 2002

(65) Prior Publication Data

US 2003/0132561 A1 Jul. 17, 2003

(30) Foreign Application Priority Data

Jul. 14, 2000 (DE) .......................................... 100 34 563

(51) Int. Cl.$^7$ ............................................... F16F 11/00
(52) U.S. Cl. ................. 267/220; 267/153; 280/124.179
(58) Field of Search .................... 280/124.177, 124.178, 280/124.179; 188/153, 219, 220

(56) References Cited

U.S. PATENT DOCUMENTS

| | | | |
|---|---|---|---|
| 4,436,869 A | 3/1984 | Zipp et al. ..................... 525/51 |
| 4,711,463 A * | 12/1987 | Knable et al. ......... 280/124.155 |
| 4,756,516 A * | 7/1988 | Tondato ....................... 267/153 |
| 4,758,601 A | 7/1988 | Haas et al. .................. 521/108 |
| 5,149,069 A * | 9/1992 | Hein ........................... 267/153 |
| 5,419,539 A | 5/1995 | Bressler |
| 5,467,970 A * | 11/1995 | Ratu et al. .................... 267/220 |
| 5,775,720 A * | 7/1998 | Kmiec et al. .......... 188/322.15 |
| 5,788,262 A * | 8/1998 | Dazy et al. ........... 280/124.155 |
| 6,037,383 A | 3/2000 | Krech et al. ................. 521/155 |
| 6,063,824 A | 5/2000 | Krech et al. ................. 521/121 |
| 6,126,155 A * | 10/2000 | Smith et al. ................. 267/220 |
| 6,182,953 B1 * | 2/2001 | Smith et al. ................. 267/220 |
| 6,254,072 B1 * | 7/2001 | Bono et al. .................. 267/220 |
| 6,296,237 B1 * | 10/2001 | Nagai .......................... 267/220 |

FOREIGN PATENT DOCUMENTS

| | | |
|---|---|---|
| DE | 19548770 | 6/1997 |
| DE | 19548771 | 6/1997 |
| EP | 0062835 | 10/1982 |
| EP | 0250969 | 1/1988 |
| EP | A 293 631 | 12/1988 |
| EP | 0036944 | 5/2003 |
| FR | 2288250 | 5/1976 |
| GB | 1285338 | 8/1972 |
| GB | 1489473 | 10/1977 |

* cited by examiner

*Primary Examiner*—Robert A. Siconolfi
(74) *Attorney, Agent, or Firm*—Fernando A. Borrego; Howard & Howard Attys.

(57) ABSTRACT

A spring element comprises an insert (1) of a compact material having a rigidity which is higher than that of the material of which the spring element consists, and comprises a part (2) which acts as an additional spring and a part (3) which acts as a spring pad.

5 Claims, 2 Drawing Sheets

SPRING ELEMENT

TECHNICAL FIELD

The present invention relates to spring elements. Preferably the spring elements are based on cellular polyurethane elastomers, which may contain polyurea structures, particularly preferably based on cellular polyurethane. elastomers having a density, according to DIN 53420, of from 200 to 1100, preferably from 300 to 800, kg/m$^3$, a tensile strength, according to DIN 53571, of $\geq 2$, preferably from 2 to 8, N/mm$^2$, an elongation, according to DIN 53571, $\geq 300$, preferably from 300 to 700, % and a tear propagation strength, according to DIN 53515, $\geq 8$, preferably from 8 to 25, N/mm. The novel spring elements are shown in detail in FIG. 1. An advantageous embodiment of the novel spring elements is shown in FIG. 2.

BACKGROUND AND SUMMARY OF THE INVENTION

The installation of a spring pad, of a damping bearing and of an additional spring is usually necessary for vibration damping. These components usually consist of microcellular polyurethane and are designed in each case for a specific intended use, produced individually and installed separately in the vehicle. The requirements which the vibration damping components have to meet differ so that they can be realized only in different sections.

The spring elements produced from polyurethane elastomers are used in automobiles, for example inside the chassis, for example those based on resilient plastics, for example rubber or elastomers based on polyisocyanate polyadducts, for example polyurethanes and/or polyureas and are generally known. They are used in particular in motor vehicles as additional springs, impact absorbers or end stops.

The novel spring elements serve, for example, in automotive construction, for supporting the primary springs, for example a steel coil spring, in the region of the chassis. The spring elements can be fastened directly or indirectly to the bodywork, to the axle or to the shock absorber. By means of the spring elements, comfort and safety of the automobiles during travel are increased.

Owing to the very different characteristics and properties of individual automobile models, the spring elements would have to be adapted individually to the various automobile models in order to achieve ideal tailoring to the chassis. For example, in the development of the spring elements, the weight of the vehicle, the chassis of the specific model, the intended shock absorbers, the dimensions of the automobile and its engine power and the desired spring characteristic may be taken into account depending on the desired comfort during travel. In addition, owing to the space availiable as a result of the design of the automobiles, it will be necessary to find individual solutions tailored to the respective automotive design.

For the abovementioned reasons, the known solutions for the design of individual spring elements cannot be applied generally to new automobile models. In every new development of an automobile model it is necessary to develop a novel form of the spring element which meets the specific requirements of the model.

The installation of a spring pad, of a damping bearing and of an additional spring is usually necessary for vibration damping. These components usually consist of microcellular polyurethane and are designed in each case for a specific intended use, produced individually and installed separately in the vehicle. The requirements which said vibration damping components have to meet differ so that they can be realized only in different sections.

For many intended uses, it would be desirable if the components for vibration damping could be produced in one piece.

It is an object of the present invention to provide a spring element for vibration damping in motor vehicles which simultaneously acts as a spring pad, a damping bearing and an additional spring, is formed of one piece and can be produced in one operation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
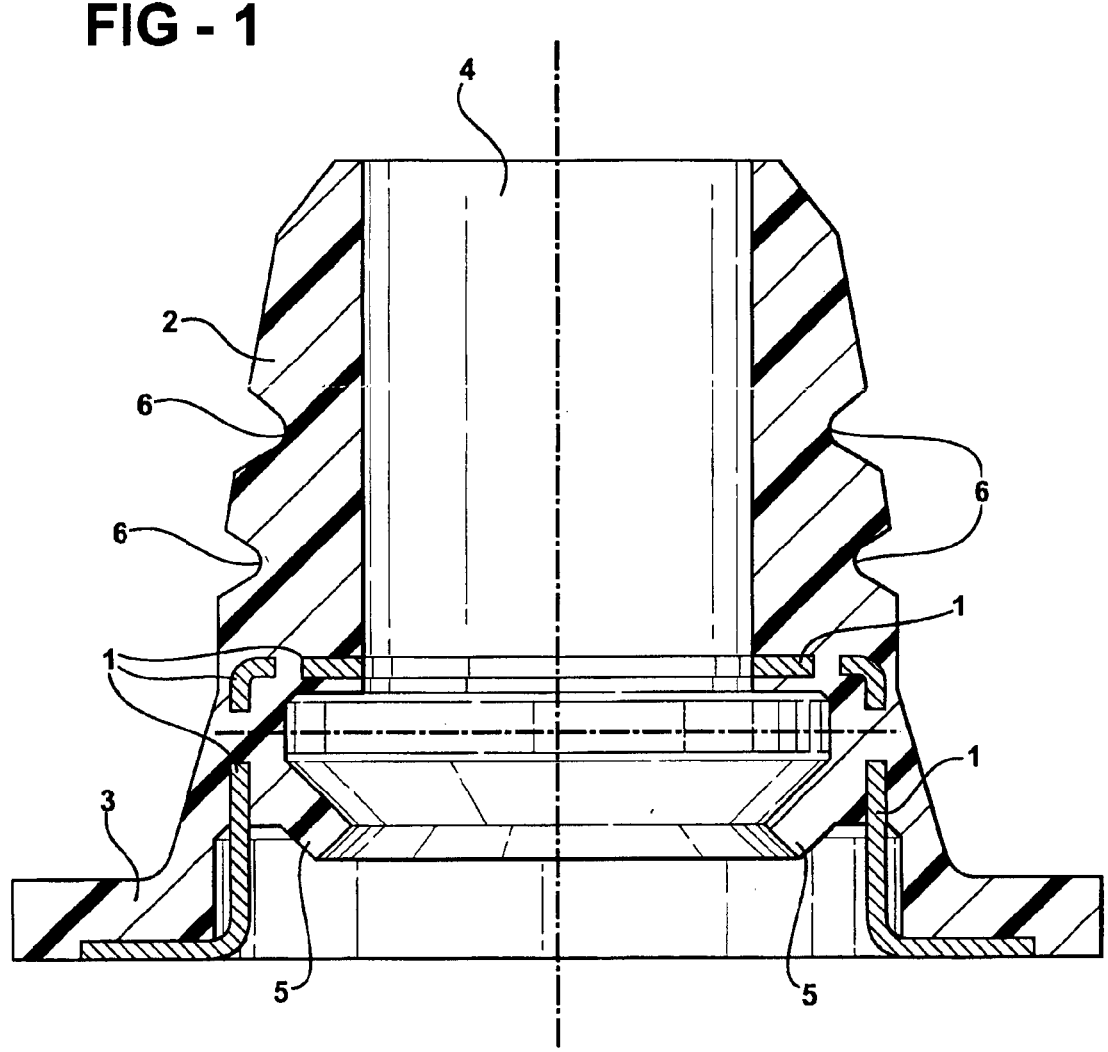
FIG. 1 is a cross-sectional side view of a spring element in accordance with the subject invention.

We have found that the object of the invention is achieved, surprisingly, by a spring element according to FIG. 1, which comprises an insert (1) of a compact material having a rigidity which is higher than that of the material of the spring element. In particular, the spring element is formed of a microcellular polyurethane elastomer, and includes a component (2) which acts as an additional spring and a component (3) which acts as a spring pad.

The present invention accordingly relates to a spring element, in particular of microcellular polyurethane, which comprises an insert (1) of a compact material having a rigidity which is higher than that of the microcellular polyurethane elastomer of which the spring element consists, and a part (2) which acts as an additional spring and a part (3) which acts as a spring pad.

Insert (1) is understood as meaning a part which is inserted into the mold and then at least partly surrounded with the polyurethane during expansion.

The novel spring element is shown in FIG. 1.

The insert (1), which is present in particular between the part (2) which acts as an additional spring and the part (3) which acts as a spring pad made it possible to connect the components to one another without the mechanical stability and the damping properties of the spring element being adversely affected. The insert (1) acts as a damping bearing The novel spring element has, in the middle, a cylindrical cavity (4) which serves for receiving the shock absorber. Indentations (6) which serve for receiving the primary spring, in particular a steel coil spring, are present in the outside of the part (2) which acts as an additional spring.

Preferably at least one protuberance (5), which is folded over the shock absorber during the installation of the spring element in the motor vehicle is preferably present in the cylindrical cavity (4), particularly between the part (2) which acts as an additional spring and the part (3) which acts as a spring pad.

The insert (1) is preferably formed of metal, in particular steel, or of a rigid plastic.

The insert (1) is introduced before the introduction of the polyurethane system into the mold in which the spring element is produced, and is removed from the mold together with the spring element.

Figure 2:
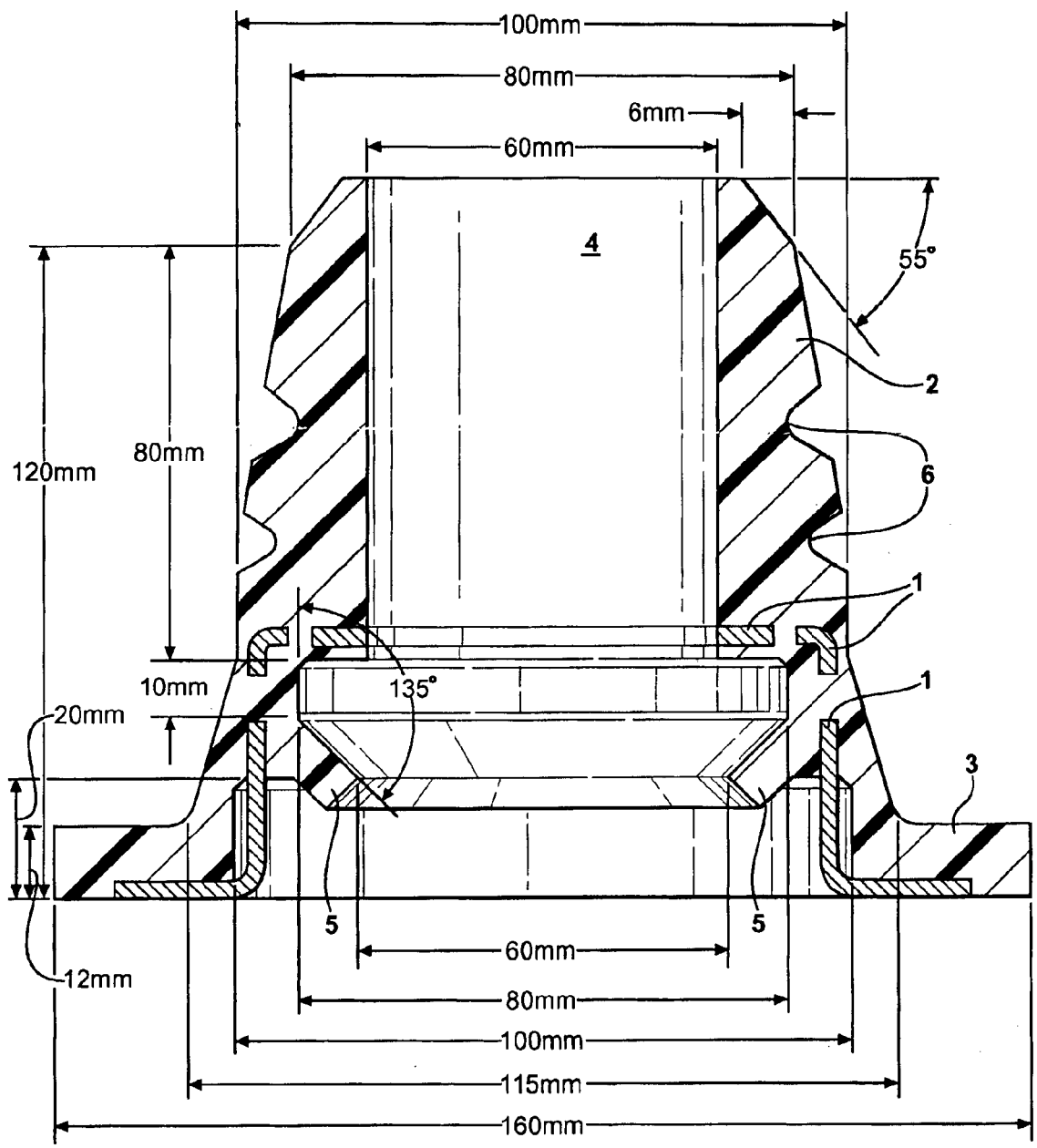
FIG. 2 is another cross-sectional side view of the spring element.

The novel spring element is shown in detail in FIG. 1, and FIG. 2 shows an advantageous embodiment of the novel spring elements. Production-related deviations in the dimensions of up to +/−2 mm in the case of the advantageous embodiment shown in FIG. 2 are tolerable. It is precisely the three-dimensional form described in FIG. 2 that proves particularly suitable for meeting the specific requirements of the specific automobile model, in particular with respect to the specific spatial requirements.

In the preferred embodiment shown in FIG. 2, the cylindrical cavity 4 has a diameter of 60 mm in the region of the additional spring 2, a height of 120 mm, a maximum external diameter of the part 2 of 80 mm, a maximum external diameter of the part 3 of 160 mm and a maximum internal diameter of the part 3 of 115 mm.

The novel spring elements are preferably based on elastomers based on polyisocyanate polyadducts, for example polyurethanes and/or polyureas, for example polyurethane elastomers which may contain urea structures. The elastomers are preferably microcellular elastomers based on polyisocyanate polyadducts, preferably comprising cells having a diameter of from 0.01 mm to 0.5 mm, particularly preferably from 0.01 to 0.15 mm. Particularly preferably, the elastomers have the physical properties described at the outset. Elastomers based on polyisocyanate polyadducts and their preparation are generally known and are widely described, for example in EP-A 62 835, EP-A 36 994, EP-A 250 969, DE-A 195 48 770 and DE-A 195 48 771.

The preparation is usually carried out by reacting isocyanates with compounds reactive toward isocyanates.

The elastomers based on cellular polyisocyanate polyadducts are usually prepared in a mold in which the reactive starting components are reacted with one another. Suitable molds here are generally customary molds, for example metal molds, which, owing to their shape, ensure the novel three-dimensional shape of the spring element.

The preparation of the polyisocyanate polyadducts can also be carried out by generally known processes, for example by using the following starting materials in a one-stage or two-stage process:
(a) isocyanate,
(b) compounds reactive toward isocyanates,
(c) water and, if required,
(d) catalysts,
(e) blowing agents and/or
(f) assistants and/or additives, for example polysiloxanes and/or fatty acid sulfonates.

The surface temperature of the inner surface of the mold is usually from 40 to 95° C., preferably from 50 to 90° C.

The production of the shaped articles is advantageously carried out using an NCO/OH ratio of from 0.85 to 1.20, the heated starting components being mixed and being introduced into a heated, preferably tightly closing mold in an amount corresponding to the desired density of the shaped article.

The shaped articles are cured after from 5 to 60 minutes and can thus be removed from the mold.

The amount of reaction mixture introduced into the mold is usually such that the moldings obtained have the density described above.

The starting components are usually introduced into the mold at from 15 to 120° C., preferably from 30 to 110° C.

The degrees of compaction for the production of the moldings are from 1.1 to 8, preferably from 2 to 6.

The cellular polyisocyanate polyadducts are expediently prepared by the one-shot process with the aid of the low-pressure technique or in particular the reaction injection molding technique (RIM) in open or, preferably, closed molds. The reaction is carried out in particular with compaction in a closed mold. The reaction injection molding technique is described, for example, by H. Piechota and H. Röhr in "Integralschaumstoffe", Carl Hanser-Verlag, Munich, Vienna 1975; D. J. Prepelka and J. L. Wharton in Journal of Cellular Plastics, March/April 1975, pages 87 to 98, and U. Knipp in Journal of Cellular Plastics, March/April 1973, pages 76–84.

When a mixing chamber having a plurality of feed nozzles is used, the starting components can be fed in individually and thoroughly mixed in the mixing chamber. It has proven advantageous to employ the two-component process.

In a particularly advantageous embodiment, first an NCO-containing prepolymer is prepared in a two-stage process. For this purpose, the component (b) is reacted with (a) in excess, usually at from 80 to 160° C., preferably from 110 to 150° C. The reaction time is based on the reaching of the theoretical NCO content.

Accordingly, the novel preparation of the molding is preferably carried out in a two-stage process in which, in the first stage, an isocyanate-containing prepolymer is prepared by reacting (a) with (b) and, in the second stage, this prepolymer is reacted in a mold with a crosslinking component containing, if required, the further components described at the outset.

In order to improve the demolding of the vibration damper, it has proven advantageous to coat the inner surfaces of the mold, at least at the beginning of a production series, with conventional external lubricants, for example based on wax or silicone, or in particular with aqueous soap solutions.

The mold residence times are on average from 5 to 60 minutes, depending on the size and geometry of the shaped articles.

After the production of the shaped articles in the mold, the shaped articles can preferably be heated for from 1 to 48 hours at, usually, from 70 to 120° C.

Regarding the starting components for the preparation of the polyisocyanate polyadducts, the following may be stated:

The isocyanates (a) may be generally known (cyclo) aliphatic and/or aromatic polyisocyanates. Aromatic diisocyanates, preferably diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate (TOBI), diphenylethane 1,2-diisocyanate and phenylene diisocyanate, and/or aliphatic isocyanates, e.g. dodecane 1,12-diisocyanate, 2-ethylbutane 1,4-diisocyanate, 2-methylpenate 1,5-diisocyanate, butane 1-4-diisocyanate and perferably hexamethylene 1,6-diisocyanate, and/or cycloaliphatic diisocyanates, e.g. cyclohexane 1,3- and 1,4-diisocyante, hexahydrotolylene 2,4- and 2,6-diisocyanate, dicyclohexylmethane 4,4'-, 2,4'- and 2,2'-diisocyanate, preferably 1-isocyanato-3,3,5-trimethyl- and 5'-isocyanatomethylcyclohexane, and/or polyisocyanates, e.g. polyphenylpolymethylene polyisocyanates, are particularly suitable for the production of the novel composite elements. The isocyanates can be used in the form of the pure compound, as mixtures and/or in modified form, for example in the form of uretdiones, isocyanurates, allophanates or biurets, preferably in the form of reaction products containing urethane and isocyanate groups, i.e. isocyanateprepolymers. Unmodified or modified diphenylmethane 2,2'-, 2,4'- and/or 4,4'-diisocyanate (MDI), naphthylene 1,5-diisocyanate (NDI), 3,3'-dimethylbiphenyl diisocyanate (TODI), tolylene 2,4- and/or 2,6-diisocyanate (TDI) and/or mixtures of these isocyanates are preferably used.

Generally known polyhydroxy compounds, preferably those having a functionality of from 2 to 3 and preferably a molecular weight of from 60 to 6000, particularly preferably from 500 to 6000, in particular from 800 to 5000, can be used as compounds (b) reactive toward isocyanates. Polyetherpolyols, polyesterpolyalcohols and/or hydroxyl-containing polycarbonates are preferably used as (b).

Suitable polyetherpolyols can be prepared by known processses, for example by anionic polymerization with alkali metal hydroxides, e.g. sodium hydroxide or potassium hydroxide, or alkali metal alcoholates e.g. sodium methylate, sodium ethylate, potassium ethylate or potassium isopropylate, as catalysts, and by addition of at least one initiator which contains 2 or 3, preferably 2 bonded reactive hydrogen atoms per molecule, or by cationic polymerization with Lewis acids, e.g. antimony pentachloride, boron fluoride etherate etc., or bleaching earths as catalsyts from one or more alkylene oxides having 2 to 4 carbon atoms in the alkylene radical.

Suitable alkylene oxides are, for example, 1,3-propylene oxide, 1,2- and 1,3-butylene oxide, preferably ethylene oxide, 1,2-propylene oxide and tetrahydrofuran. The alkylene oxides can be used individually, alternately in succession or as mixtures. Examples of suitable initiator molecules are water, organic dicarboxylic acids, such as succinic acid, adipic acid, phthalic acid and terephthalic acid, aliphatic and aromatic, N-monoalkyl- and N,N'-dialkyl-substituted diamines having 1 to 4 carbon atoms in the alkyl radicals, such as monoalkyl and dialkyl-substituted ethylenediamine, 1,3-propylenediamine, 1,3- and 1,4-butylenediamine, 1,2-, 1,3-, 1,4-, 1,5- and 1,6-hexamethylenediamine, alkanolamines, e.g. ethanolamine, N-methyl- and N-ethylethanolamine, dialkanolamines, e.g. diethanolamine, N-methyl- and N-ethyldiethanolamine, and trialkanolamines, such as triethanolamine, and ammonia. Dihydric and/or trihydric alcohols, for example alkanediols of 2 to 12, preferably 2 to 4 carbon atoms, such as ethanediol, 1,2- and 1,3-propanediol, 1,4-butanediol, 1,5-pentanediol, 1,6-hexanediol, glycerol, and trimethylolpropane, and dialkylene glycols, e.g. diethylene glycol and dipropylene glycol, are preferably used.

Polyesterpolyalcohols, also referred to as polyesterpolyols, are preferably used as (b). Suitable polyesterpolyols can be prepared, for example, from dicarboxylic acids of 2 to 12 carbon atoms and dihydric alcohols. Examples of suitable dicarboxylic acids are aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures. For the preparation of the polyesterpolyols, it may be advantageous to use, instead of the carboxylic acid, the corresponding carboxylic acid derivatives, such as carboxylic esters having 1 to 4 carbon atoms in the alcohol radical, carboxylic anhydrides or carbonyl chlorides. Examples of dihydric alcohols are glycols of 2 to 16, preferably 2 to 6 carbon atoms, e.g. ethylene glycol, diethylene glycol, 1,4-butanediol, 1,5-pentanediol, 1,6-hexanediol, 1,10-decanediol, 2-methylpropane-1,3-diol, 2,2-dimethylpropane-1,3-diol, 1,3-propanediol and dipropylene glycol. Depending on the desired properties, dihydric alcohols can be used alone or, if required, in mixtures with one another.

Preferably used polyesterpolyols are ethanediol polyadipates, 1,4-butanediol polyadipates, ethanediol butanediol polyadipates, 1,6-hexanediol neopentylglycol polyadipates, 1,6-hexanediol 1,4-butanediol polyadipates, 2-methyl-1,3-propanediol 1,4-butanediol polyadipates and/or polycaprolactones.

Suitable polyoxyalkylene glycols containing ester groups, essentially polyoxytetramethylene glycols, are polycondensates of organic, preferably aliphatic dicarboxylic acids, in particular adipic acid, with polyoxymethylene glycols having a number average molecular weight of 162 to 600 and, if required, aliphatic diols, in particular 1,4-butanediol. Other suitable polyoxytetramethylene glycols containing ester groups are those polycondensates formed from the polycondensation of e-caprolactone.

Suitable polyoxyalkylene glycols containing carbonate groups, essentially polyoxytetramethylene glycols, are polycondensates of these with alkyl or aryl carbonates or phosgene.

Exemplary embodiments for the component (b) are given in DE-A 195 48 771, page 6, lines 26 to 59.

In addition to the components reactive toward iocyanates and described above, low molecular weight chain extenders and/or crosslinking agents (b1) having a molelcular weight of less than 500, preferably from 60 to 499 can furthermore be used, for example those selected from the group consisting of the di- and/or trifunctional alcohols, di- to tetrafunctional polyoxyalkylenepolyols and the alkyl-substituted aromatic diamines or mixtures of at least two of said chain extenders and/or crosslinking agents.

For example, alkanediols of 2 to 12, preferably 2, 4 or 6, carbon atoms may be used as (b1), for example ethanediol, 1,3-propanediol, 1,5-pentanediol, 1,6-hexanediol, 1,7-heptanediol, 1,8-octanediol, 1,9-nonanediol, 1,10-decanediol and preferably 1,4-butanediol, dialkylene glycols of 4 to 8 carbon atoms, e.g. diethylene glycol and dipropylene glycol, and/or di- to tetrafunctional polyoxyalkylenepolyols.

However, branched and/or unsaturated alkanediols of, usually, not more than 12 carbon atoms are also suitable, e.g. 1,2-propanediol, 2-methyl-1,3-propanediol, 2,2-dimethyl-1, 3-propanediol, 2-butyl-2-ethyl-1,3-propanediol, but-2-ene-1,4-diol and but-2-yne-1,4-diol, diesters of terephthalic acid with glycols of 2 to 4 carbon atoms, e.g. bisethylene glycol or 1,4-butanediol terephthalate, hydroxyalkylene ethers of hydroquinone or of resorcinol, e.g. 1,4-di-(β-hydroxyethyl) hydroquinone or 1,3-di(β-hydroxyethyl)resorcinol, alkanolamines of 2 to 12 carbon atoms, e.g. ethanolamine, 2-aminopropanol and 3-amino-2,2-dimethylpropanol and N-alkyldialkanolamines, e.g. N-methyl- and N-ethyldiethanolamine.

Examples of crosslinking agents (b1) having a higher functionality are trifunctional alcohols and alcohols having a higher functionality, e.g. glycerol, trimethylolpropane, pentaerythritol and trihydroxycyclohexanes, as well as trialkanolamines, e.g. triethanolamine.

The following may be used as chain extenders: alkyl-substituted aromatic polyamines having molecular weights of, preferably, from 122 to 400, in particular primary aromatic diamines which have, ortho to the amino groups, at least one alkyl substituent which reduces the reactivity of the amino group by steric hindrance, and which are liquid at room temperature and are at least partially, preferably, however, completely, miscible with the higher molecular weight, preferably at least difunctional compounds (b) under the processing conditions.

For the preparation of the novel moldings, the industrially readily obtainable 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, i.e. DETDA, isomer mixtures of 3,3'-di- or 3,3',5,5'-tetraalkyl-substituted 4,4'-diaminodiphenylmethanes having 1 to 4 carbon atoms in the alkyl radical, in particular 3,3',5,5'-tetraalkyl-substituted 4,4'-diamino-diphenylmethanes containing bonded methyl, ethyl and isopropyl radicals, and mixtures of said tetraalkyl-substituted 4,4'-diamino-diphenylmethanes and DETDA, can be used.

In order to obtain specific mechanical properties, it may also be expedient to use the alkyl-substituted aromatic polyamines as a mixture with the abovementioned low molecular weight polyhydric alcohols, preferably dihydric and/or trihydric alcohols or dialkylene glycols.

Preferably, however, no aromatic diamines are used. The preparation of the novel products is thus preferably carried out in the absence of aromatic diamines.

The preparation of the cellular polyisocyanate polyadducts can preferably be carried out in the presence of water (c). The water acts both as a crosslinking agent with formation of urea groups and, owning to the reaction with isocyanate groups with formation of carbon dioxide, as a blowing agent. Because of this dual function, it is mentioned in this document separately from (e) and (b). By definition, the components (b) and (e) thus contain no water which by definition is mentioned exclusively as (c).

The amounts of water which may be expediently used are from 0.01 to 5, preferably from 0.3 to 3.0, % by weight, based on the weight of the component (b). The water may be used completely or partially in the form of the aqueous solutions of the sulfonated fatty acids.

In order to accelerate the reaction generally known catalysts (d) may be added to the reaction batch, both in the preparation of a prepolymer and, if required, in the the reaction of a prepolymer with a crosslinking component. The catalysts (d) may be added individually or as a mixture with one another. These are preferably organometallic compounds, such as tin(III) salts of organic carboxylic acids, e.g. tin(II) dioctanoate, tin(II) dilaurate, dibutyltin diacetate and dibutyltin dilaurate, and tertiairy amines, such as tetramethylethylenediamine, N-methylmorpholine, diethylbenzylamine, triethylamine, dimethylcyclohexylamine, diazabicyclooctane, N,N'-dimethylpiperazine, N-methyl,N'-(4-N-dimethylamino)butylpiperazine, N,N,N',N'',N''-pentamethyldiethylenediamine or the like.

Other suitable catalysts are amidines, e.g. 2,3-dimethyl-3,4,5,6-tetrahydropyrimidine, tris(dialkylaminoalkyl)s-hexahydrotriazines, in particular tris(N,N-dimethylaminopropyl)s-hexahydrotriazine, tetraalkylammonium hydroxides, e.g. tetramethylammonium hydroxide, alkali metal hydroxides, e.g. sodium hydroxide, and alkali metal alcoholates, e.g. sodium methylate and potassium isopropylate, and alkali metal salts of long-chain fatty acids having 10 to 20 carbon atoms and, if required, OH side groups.

Depending on the reactivity to be established, the catalysts (d) are used in amounts of from 0.001 to 0.5% by weight, based on the prepolymer.

If required, conventional blowing agents (e) may be used in the polyurethane preparation. For example, low-boiling liquids which vaporize under the influence of the exothermic polyaddition reaction are suitable. Liquids which are inert to the organic polyisocyanate and have boiling points below 100° C. are suitable. Examples of such preferably used liquids are halogenated, particularly fluorinated hydrocarbons, e.g. methylene chloride and dichloromonofluoromethane, perfluorinated or partially fluorinated hydrocarbons, e.g. trifluoromethane, difluoromethane, difluoroethane, tetrafluoroethane and heptafluoropropane, hydrocarbons, e.g. n-butane, isobutane, n-pentane and isopentane and the industrial mixtures of these hydrocarbons, propane, propylene, hexane, heptane, cyclobutane, cyclopentane and cyclohexane, dialkyl ethers, e.g. dimethyl ether, diethyl ether and furan, carboxylic esters, e.g. methyl and ethyl formate, ketones, e.g. acetone, and/or fluorinated and/or perfluorinated, tertiary alkylamines, e.g. perfluorodimethylisopropylamine. Mixtures of these low-boiling liquids with one another and/or with other substituted or unsubstituted hydrocarbons can also be used.

The most expedient amount of low-boiling liquid for the preparation of such cellular resilient moldings from elastomers containing bonded urea groups depends on the density which it is intended to achieve and on the amount of the water preferably present. In general, amounts of from 1 to 15, preferably from 2 to 11, % by weight, based on the weight of the component (b), give satisfactory results. Particularly preferably, exclusively water (c) is used as a blowing agent.

In the novel preparation of the shaped articles, assistants and additives (f) may be used. These include, for example, generally known surfactants, hydrolysis stabilizers, fillers, antioxidants, cell regulators, flameproofing agents and colorants. Suitable surfactants are compounds which serve for supporting the homogenization of the starting materials and, if necessary, are also suitable for regulating the cell structure. Examples are compounds in addition to the novel emulsifiers and having an emulsifying effect such as the salts of fatty acids with amines, for example of oleic acid with diethylamine, or of stearic acid with diethanolamine and of ricinoleic acid with diethanolamine, salts of sulfonic acids, for example alkali metal or ammonium salts of dodecylbenzene- and dinaphthylmethanedisulfonic acid.

Foam stabilizers, for example oxyethylated alkylphenols, oxyethylated fatty alcohols, liquid paraffins, castor oil esters or ricinoleic acid esters, Turkey red oil and peanut oil, and cell regulators such as paraffins and fatty alcohols, are also suitable. Moreover, polysiloxanes and/or fatty acid sulfonates can also be used as (f). The polysiloxanes used may be generally known compounds, for example polymethylsiloxanes, polydimethylsiloxanes and/or polyoxyalkylene/silicone copolymers. The polysiloxanes preferably have a viscosity of from 20 to 2000 mPa.s at 25° C.

The fatty acid sulfonates used may be generally known sulfonated fatty acids which are also commercially available. A preferably used fatty acid sulfonate is sulfonated castor oil.

The surfactants are usually used in amounts of from 0.01 to 5 parts by weight, based on 100 parts by weight of component (b).

We claim:

1. A spring element comprising:
   a first part (2) having a central cylindrical cavity (4) with said first part (2) acting as an additional spring;
   a second part (3) extending directly from said first part (2) transverse to said central cylindrical cavity (4) of said first part (2) to form an integral one-piece spring element with said second part (3) acting as a spring pad and said first (2) and second (3) parts being formed of a common material; and an insert (1) at least partially encapsulated by both of said first (2) and second (3) parts with said insert (1) formed of a compact material having a rigidity that is higher than said common material of said first (2) and second (3) parts.

2. A spring element as claimed in claim 1, wherein said common material of said first (2) and second (3) parts is further defined as a microcellular polyurethane elastomer or a polyurethane/polyurea elastomer.

3. A spring element as claimed in claim 1, wherein said insert (1) consists of metal.

4. A spring element as claimed in claim 1, wherein said insert (1) consists of rigid plastic.

5. A spring element as claimed in claim 1, wherein said insert (1) is disposed between said first part (2) which acts as an additional spring and said second part (3) which acts as a spring pad.

* * * * *